United States Patent [19]

Bradley et al.

[11] 4,352,766
[45] Oct. 5, 1982

[54] SCRAPLESS FORMING OF PLASTIC ARTICLES

[75] Inventors: Norbert L. Bradley; Kenneth J. Cleereman; Ritchie A. Wessling, all of Midland, Mich.

[73] Assignee: The Dow Chemical Co., Midland, Mich.

[21] Appl. No.: 209,639

[22] Filed: Nov. 24, 1980

Related U.S. Application Data

[60] Division of Ser. No. 736,628, Oct. 28, 1976, Pat. No. 4,323,531, which is a continuation of Ser. No. 484,498, Jul. 1, 1974, abandoned, which is a division of Ser. No. 215,632, Jan. 5, 1972, abandoned, which is a continuation-in-part of Ser. No. 119,669, Mar. 1, 1971, abandoned.

[51] Int. Cl.³ .............................................. B29D 9/00
[52] U.S. Cl. .................................... 264/45.5; 264/51; 264/54; 264/119; 264/120; 264/126; 264/122
[58] Field of Search ................ 264/51, 54, 45.5, 320, 264/119, 120, 126, 122

[56] References Cited

U.S. PATENT DOCUMENTS

| | | | |
|---|---|---|---|
| 2,782,180 | 2/1957 | Weidman | 264/122 |
| 3,662,052 | 5/1972 | Nowak et al. | 264/119 |
| 3,709,965 | 1/1973 | Campbell | 264/45.5 |
| 3,739,052 | 6/1973 | Ayres et al. | 264/92 |

*Primary Examiner*—James R. Hall
*Attorney, Agent, or Firm*—Lloyd E. Hessenaur, Jr.

[57] ABSTRACT

A scrap-free, substantially solid phase, relatively low temperature economical process for rapidly making plastic articles from resinous powders wherein the resultant articles can comprise various polymers including oriented polymers; polymers with a high practical heat distortion temperature; expanded polymers; ultra high molecular weight polymers; blended structures of two or more materials; or multilayered structures. The resinous powders are initially compressed into briquettes, which briquettes are heated to a temperature in the range from about the alpha transition temperature to less than the melting point or melt temperature of the polymer therein to both somewhat soften and sinter the briquettes. The sintered briquettes are forged under conditions which permit substantial plug flow deformation into preforms whereby fusion of the sintered resin powder particles occurs. The resulting preforms can then be cooled for later thermoforming or can be directly transferred to thermoforming molds for forming into desired shaped articles. It is also possible to form at least shallow cans, lids or other items directly in the forging step.

4 Claims, 6 Drawing Figures

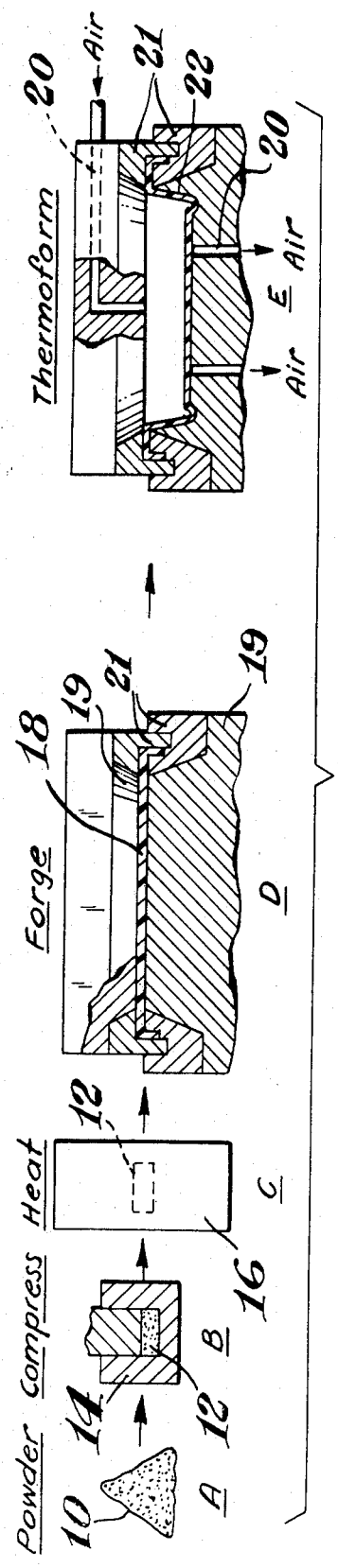

SCRAPLESS FORMING OF PLASTIC ARTICLES

CROSS-REFERENCE TO RELATED APPLICATION

This application is a division of application Ser. No. 736,628, filed Oct. 28, 1976, now U.S. Pat. No. 4,323,531, which is a continuation of application Ser. No. 484,498, filed July 1, 1974, now abandoned, which in turn was a division of application Ser. No. 215,632 filed Jan. 5, 1972, now abandoned, which itself was a continuation-in-part of application Ser. No. 119,669, filed Mar. 1, 1971, now abandoned.

DESCRIPTION OF THE INVENTION

There has been a need for a fast, substantially solid phase, essentially scrap-free process for forming articles, such as containers, directly from powdered thermoplastic resin materials. Such powder formed parts can be made at a lesser expense than a comparable part made by either an injection molding technique or a conventional vacuum forming process. The reasons for the favorable economics of powder formed parts are elimination of a pelletizing step, the process is essentially scrapless, a reduced cooling cycle and more efficient material utilization.

More specifically, for those polymers polymerized by a process which results in powder right from the reactor, the pelletizing (extruding of pellets) is eliminated if the resulting powder can be formed directly as by this invention. This can result in a substantial savings in material cost. Furthermore, whereas most plastic working processes develop some scrap, especially vacuum forming, the powder process is essentially scrapless in that only the amount of powder needed for the part is used. The only scrap generated by this powder process will therefore be from rejected parts. In addition, the time required for cooling of the part in injection molding, constitutes a significant part in total cost of the article. Here again the present powder forming process shows a highly significant advantage since it is essentially a solid phase forming technique. A typical cycle time for injection molding is greater than three seconds while cycle times of less than two seconds are possible in the present powder forming process. Likewise, the present invention permits minimum wall thicknesses not considered acceptable by injection molding standards. Thus, it is one of the objects of the present invention to allow many thermoplastic articles to be made more economically than at present.

There are many prior art references that teach compression molding of containers from heated thermoplastic resinous powders, examples of which are found in U.S. Pat. Nos. 3,505,441 by R. Goetgheluck and 3,021,567 by F. Ranalli. These prior art processes teach forming of containers or other articles from resin powder heated to a plasticizing temperature, i.e., to at least the melting point or melt temperature of the resin powder, so that all the particles are in a substantially viscous state and then compressing the melted particles into a solid mass, i.e., compression molding. However, there are particular problems in such a process. To use such a high heat process with, for example, a saran barrier resin (a vinylidene chloride based homopolymer or copolymer) would result in substantial degradation of the saran resin. Thus, one of the objects of the present invention is to provide a scrap-free process for economically manufacturing articles which does not result in substantial degradation of particular resins comprising such articles, which resins provide the articles with highly advantageous characteristics.

It is also among other objects of this invention to provide a process which can fabricate from thermoplastic resinous powders, articles which if desired can be composed of a single polymer which has been oriented for toughness and improved stress crack resistance; or a single polymer which is essentially stress free (no orientation) which has a high practical heat distortion temperature; or a polymer which has been expanded to form foam articles with good rigidity, insulation properties and shock resistance; or a blended structure of two or more materials one at least of which is a plastic resinous material providing improved moisture vapor and/or gas barrier properties; or a multilayer structure which combines the desired attributes of the solid polymers, foams, and/or blended system; or particularly difficult forming polymers, such as very high and ultra high molecular weight polymers.

Briefly, it has been found that the objects and advantages of the present invention can be achieved by using an essentially scrap-free, fast cycle system, coupled with a thermoforming process. The system involves forming of briquettes and then sintering and forging of the briquettes into preforms having the desired properties. The preforms then are either directly or subsequently thermoformed into containers or other articles having a desired shape and size. The forming of preforms from sheet stock has been taught, for example, in U.S. application Ser. No. 62,969, filed Aug. 11, 1970, now issued as U.S. Pat. No. 3,739,052, and assigned to the same assignee as is the present invention, which application is hereby incorporated in full by reference. The same clamp ring mechanism described in that application can be used to clamp the preforms made from the various powder systems, and transport the same to a thermoforming apparatus. The use of the clamp ring mechanism provides for the formation of a perform, the center of which is maintained at its forming temperature while the peripheral portion thereof, located within the ring, is brought below the alpha transition temperature, as hereinafter defined, of the thermoplastic resin in the preform.

Essentially, the powders are initially compressed into briquettes under pressure and generally at room temperature to the extent that they have adequate strength for handling. The briquettes are then heated to a temperature from about the alpha transition temperature ("T$\alpha$") to less than the melting point or melt temperature ("Tm") of the polymer to both somewhat soften and to sinter the briquette short of complete fusion. Where the powder is not sufficiently self-lubricating or any lubricants contained within the resin mass are of insufficient quantity and/or do not exude to the surface adequately, the surfaces of the sintered briquette are lubricated, or molds in which it is to be forged are alternately lubricated. The sintered briquette is then squeezed or forged at a temperature between T$\alpha$ and Tm into a preform whereby fusion of the sintered powder particles occurs under conditions which result in substantial plug flow deformation of the briquette. To obtain effective fusion under substantially plug flow conditions the mold is also warmed to a temperature between T$\alpha$ and Tm for the briquette. The resulting preform can then be cooled for later thermoforming or can be directly transferred to a thermoforming mold while still warm for forming into a desired shaped article. It is also possible to form at least a shallow can or lid directly in the forging step.

During heating of a briquette to sinter the same, a limited amount of surface melting, i.e., heating to at least the melting point or melt temperature, of the resin particles in the briquette can be tolerated. However, if the melted surface resin particles are of sufficient amount, either uniformly spread over the briquette or localized in any small section such as the peripheral edge thereof, to cause a significant detrimental effect in subsequent direct thermoforming of the forged preform, a defective article can result which has a substantially thinner wall thickness in the area containing the original melting resin particles. This problem is apparent where immediate direct thermoforming of the heated preform occurs without intermediate cooling of the same. The briquette need not be under pressure during sintering.

An additional reason for limiting the amount of tolerable melting surface resin particles, regardless of when the subsequent thermoforming step occurs, is to prevent substantial degradation of heat sensitive polymer materials in the resin powder caused by an excessive heat history during processing.

For purposes of this application, "sintering" may be considered the process by which an assembly of particles, compacted under pressure, physically and/or chemically bond themselves across contacting particle interfaces or boundaries into a coherent body under the influence of elevated temperature, without substantial melting generally occurring.

When a briquette is "forged" it is meant that its resin particles are fused at a temperature below thermal melt forming temperatures ("Tm") and, when forged into a preform or article, it has generally the same density and generally the same or improved mechanical properties as it would have if made by conventional melt forming processes. Forging to form a fused preform or article is apparently accomplished by extensive lateral shearing of the resin particles which promotes fusion thereof.

"Plug flow" is the condition by which the briquette deforms in an essentially multiaxial stretching mode such that the velocity gradient through the thickness of the sheet is relatively constant. This is in contrast to the usual parabolic flow pattern observed in conventional molding of polymers in a viscous state. The velocity varies from zero at the mold surfaces to a maximum near the mold center. Plug flow is achieved by reducing the frictional drag at the mold surface. This is conveniently accomplished by placing a lubricant between the briquette and the contacting metal surfaces since few presently known resins are sufficiently self-lubricating for this purpose.

By "lubricant" is meant any substance which can be applied to either the mold and/or the briquette surfaces which will either reduce friction between the mold and powder or will deform easier than the powder, and serves as an interface layer between the briquette being formed and the mold during the forming, and is compatible with the powder, e.g., is noncrazing.

An explanation of the "alpha transition temperature" can be found in *Anelastic and Dielectric Effects in Polymeric Solids*, pages 141-143, by N. G. McCrum, B. E. Read and G. Williams; J. Wiley and Sons, N.Y., N.Y., published 1967. In other places in this same publication descriptions of how the alpha transition temperature can be measured are found. For amorphous polymer resins, the "alpha transition temperature" ("T$\alpha$") is considered to be the temperature at the start of the glass-rubber relaxation region associated at its lower end with the glass transition. In the case of crystalline polymers, the "alpha transition temperature" is taken as an energy loss peak associated with the crystalline region often observed about 50° C. to 100° C. below the melting point of the polymer, a well known example of which occurs at about 50° C. in polyethylene.

"HDPE" means high density polyethylene as illustrated, for example, in Example I hereof.

The "Dow Mass Spectrometer Gas Transmission Rate Apparatus" is a device developed by The Dow Chemical Company, Midland, Mich.

"Melting point" or "melt temperature" ("Tm") means the temperature where the material reaches a melt or viscous fluid flow state and is normally melt formed by a process such as injection molding.

Resin powders utilized in the solid state process herein described are formed from polymers which may be classified as either amorphous or crystalline. In both cases, the powders consist of finely divided, solid polymeric materials. However, the physical state of the amorphous polymers is that of a glassy solid, whereas the crystalline polymers exist in the form of crystalline particles below their melting point. Crystalline polymers also usually have a varying amount of amorphous phase polymer associated with their crystalline structure. Since these materials are in different physical states, the conditions under which they form are necessarily different.

Considering first the amorphous or glassy polymers, the powder resins formed therefrom are hard or brittle below the alpha transition temperature as herein defined and will not fuse even under very high pressures. Above the alpha transition temperature, however, the amorphous polymers become ductile (often being described as "rubbery" or "leathery,") and are still in a solid phase by common definition and as herein defined, even though theoretically they are a very high viscosity, viscoelastic fluid or liquid. At a sufficiently high temperature, the amorphous polymers soften to the extent that they become more like viscous liquids than leathery solids. The temperature range over which this change occurs is the flow or melt temperature and is herein defined as the "melt temperature" of the amorphous polymers. In prior art fabrication technology, the amorphous polymers are heated into this temperature range before forming. The initial sintering step herein described puts the resin powder in the briquette into the leathery state where it remains throughout the fusing and forging steps of the present process. The optimum sintering temperature and time will vary substantially depending on the type of polymer employed and the physical characteristics of its particles, but will always fall between the alpha transition temperature and the melt temperature. A certain degree of densification customarily occurs during the sintering step.

Crystalline polymers form under a more complex process. Like amorphous polymers, they are not formable below the glass transition, but even above the glass transition within the range where amorphous polymers will form, the rigidity of the crystalline phase may prevent coalescence of the particles into a continuous mass. Crystalline polymers generally have to be heated to at least a higher energy loss peak (alpha transition temperature as herein defined for crystalline polymers) which falls between the glass transition and melting point of the crystalline polymers before they become ductile enough to cold flow and fuse. When heated still further above the alpha transition temperature, crystalline polymers become increasingly ductile and finally start to melt. Melting in crystalline polymers customarily occurs over a range of about 20° C. or more. The upper limit, at which the last traces of crystallinity disappears, is called the "melting point" as herein defined. In prior art fabrication technology, the polymer is heated to about the melting point or above before forming. Like amorphous polymers, the crystalline polymers are a viscous fluid or liquid above the melting point. If the briquette described herein were heated uniformly to temperatures above the melting point, the process would be of a conventional viscous flow type.

It is essential to obtain the benefits of the solid state forming process, herein described, that the polymer not be completely fused in the preheating or sintering of the briquette. By maintaining the temperature of the briquette below and melting point and melt temperature for the crystalline and amorphous polymers, respectively, the particles therein are able to deform and fuse by a substantially plastic solid phase flow mechanism.

Additional objects and advantages of the present invention are even more apparent when taken in conjunction with the accompanying drawing, in which;

FIG. 1 is a diagrammatic representation of steps of this invention, here designated as steps A through E, whereby powder resin is formed into containers;

FIG. 1A is a diagrammatic illustration of a modified step D' wherein the part formed at this step is the final part;

FIG. 2 is an enlarged fragmentary crosssection of a wall section of the container shown in step E of FIG. 1 when the container is formed from a single nonfoamable resin powder;

FIG. 3 is like FIG. 2 only where the container is formed from a foamable resin powder;

FIG. 4 is like FIG. 2 only where the container is formed from a blend of resin powders; and FIG. 5 is like FIG. 2 only where the container is formed from multilayers of resin powders.

The invention hereof will be described hereinafter in detail with respect to its broad applicability to various resin powders, including but not limited to nonfoamable, single resin powders, foamable resin powder formulations, blended resin powders and multilayered resin powders. Generally, in forming a powder resin using the substantially solid phase forming process of the present invention, a certain series of steps are employed. The steps are generally as follows, referring to FIG. 1:

An amount of powder resin 10 is measured at Step A sufficient to make an article. This powder is then compressed into a briquette 12 under pressure, generally at room temperature, a Step B in a mold 14 sufficient to provide "green strength," i.e., strength to hold together in a given configuration at room temperature. The briquette 12 is then heated, usually without pressure, in an oven 16 or its equivalent at Step C to a temperature from about the alpha transition to less than the melting point or melt temperature of the polymer, to both somewhat soften and to sinter the briquette 12 short of complete fusion. Where the powder is not sufficiently self-lubricating, or lubricants which may be contained in the resin mass are of insufficient quantity and/or do not exude to the surface adequately, the surfaces of sintered briquette 12 are lubricated, or the platens 19 of a mold in which it is to be compressed are alternately lubricated. The sintered briquette is then squeezed or forged into a preform 18, which can be disc shaped, at Step D whereby fusion of the sintered powder particles occurs under conditions of substantial plug flow. To form effective fusion and provide for such conditions the mold platens 19 are also warmed to a temperature between the Tα and Tm of the briquette 12. The resulting preform can then be cooled for later thermoforming or can be directly transferred by a clamp ring 21 to a thermoforming mold while still warm for forming into a desired shaped article at Step E by differential air pressure means 20, or by matched die forming, vacuum forming, plug assist-vacuum forming, draw-forming, impact forming, rubber pad forming, hydro-forming or the like. One such direct thermoforming operation is shown in the aforesaid U.S. application Ser. No. 62,969, now issued as U.S. Pat. No. 3,739,052, for example, and which application also describes in detail the function and operation of a clamping ring, like clamping ring 21 hereof. Sufficient heat or additional heat may be generated for thermoforming by application of plug assist or other forming pressures. This is frictional heat resulting from working of a preform below its melt temperature. It is also possible to form in a set of impact molds 44 a finished article 42, such as a shallow can or lid, directly in the forging step as illustrated in Step D' of FIG. 1A, which can be considered an impact molding as well as a forging step.

By use of lubrication on the mold or briquette surfaces the deformation pattern during forging of the briquette into a preform is changed from one of a "parabolic flow" to one of stretching, "plug flow," as defined earlier. It has thus been found that in forging briquettes of thermoplastic powders, such as between flat anvils of a mold to form a disc, unsatisfactory results are obtained unless plug flow deformation occurs. An adequate lubricant is thus used between the surfaces of the mold and the surfaces of the briquette where necessary to achieve plug flow. Plug flow deformation is an important parameter in the forming of powders. As lubricants, greases such as potassium oleate, silicone grease and oils or other substantially equivalent material can be wiped on the mold or briquette, solid particles, such as polytetrafluoroethylene or zinc stearate can be sprayed onto the mold or a polytetrafluoroethylene coat can be baked onto the mold. All of these lubricants have been tried and work to a degree, with the greases working especially well. The advantages of lubricating the mold for heat sensitive resin materials are two-fold. One, it changes the flow pattern of the fused material to plug flow so that less springback (warpage) is obtained in the formed piece. Second, it changes the pattern of heat build-up in the material giving a uniform temperature rise over the entire preform, rather than a concentrated temperature rise in a localized area, e.g., the center of the preform. Springback causes a generally flat piece to wrap when removed from a press.

The advantage of using a lubricant when forming powders in the solid phase has been demonstrated, for example, by squeezing polyvinylidene chloride powder (briquettes were made as in Step B previously described) between two flat anvils (typified by Step D previously described) under the following range of conditions:

| polymer temperature | (room to 300° F.) |
| --- | --- |
| mold temperatures | (100° to 300° F.) |
| dwell time | (0 to 10 seconds) |

| | |
|---|---|
| rotation of upper mold | (0 to 200 rpm) |
| amount of deformation | (10 mil is the thinnest article formed in a single stamp) |
| total cycle time of press | (1.2 seconds) |

In general, the best conditions for forming flat fused preforms free from degradation from these briquettes was a warm mold and polymer (both being in the range of 150°–300° F.) and a slight amount of dwell (about ½ second). By slight relative rotation of mold surfaces it was found thinner pieces can be obtained.

It has also been discovered that a film of an easily deformable plastic can be used as the lubricant in the process of this invention. This has been demonstrated by using low density polyethylene film laid loosely on a polyvinylidene chloride briquette. The sandwich was stamped and formed into a nondegraded preform. The necessary conditions for the film to act as a lubricant is that it be kept below the temperature at which it becomes tacky and that it deforms easier than the polymer being shaped. The advantage of using a polymer film lubricant to produce finished parts is significant in certain high volume commercial applications because the sprayed on, wiped on or baked on lubricants eventually wear away or build up on the mold and, therefore, the amount of lubricant has to be constantly controlled and, for food packaging applications, the wiped or sprayed on lubricants have to be removed unless government (U.S. Food and Drug Administration) approved.

It was thus found that if a proper lubricant is used, heat sensitive thermoplastic resin powders such as a high vinylidene chloride saran, i.e., a copolymer comprising about 70% by weight or more of vinylidine chloride and a remainder of one or more olefinically unsaturated monomers copolymerized therewith, can be formed without degrading the polymer by solid phase forming processes, and nondegradable polymers can be formed into preforms or other articles without severe warpage of the same occurring.

Lubrication may not be necessary for polymers which have inherently slippery surfaces sufficient to achieve plug flow under forging conditions. Possibilities may be the fluoro-carbon polymers, nylon and ultra high molecular weight polyethylenes. But even in these cases, some lubrication may be preferred in order to maintain better control in the forging step.

Not all resin powders will work equally well with the present invention. Generally, those which have a small particle size, a broad particle size distribution, an irregular shaped particle, low bulk density, and high ductility have been found to be those which form the best. Other factors which are believed to affect how well thermoplastic powders form in the process are presence of surface contaminates such as soap films, the crystal morphology for crystalline polymers, impurities and inclusions and varying compositions of base polymers and, somewhat less directly, molecular weight, type of polymerization, degree of polymerization and flow properties.

Resin powders need to have a briquette compaction sufficient for handling. Adequate compaction prior to forging is needed. One way to achieve this is to provide high compaction in the briquette. It has been found that a briquette compaction of about 85 percent or higher form particularly well in the process herein described.

The test for percent compaction of briquettes was based on the average apparent density for a fused mass of the particular type of polymer tested. The briquettes were formed at ambient room temperature (about 72° F.) in a mold under about 30,000 p.s.i. pressure and have a weight of about 8 grams, a diameter of about 1½ inches and a thickness of about 0.3 inches depending on the degree of compaction. Although the above compaction range for briquettes provides a preferred range area for resin powders which form particularly well in the present invention, other resin powders which do not fall in this range may also form well in the process herein described depending on other physical characteristics thereof. An example is where extended sintering time improves particle interfacial or boundary bonding which results in better performance of some resins that are more difficult than others to form in the present process.

Another physical property which is apparently significant and which can be used to select resin powders that form particularly well in the process herein described, is the green breaking strength of the briquettes. For test purposes, the briquettes were formed the same as for the percent compaction test described above. The green breaking strength of the briquettes was determined at ambient room temperature (about 72° F.) on compression testing apparatus by placing the briquettes on a flat metal base and then forcing a 9/16 inch steel ball into the center of the same at a rate of about 0.02 inches per minute until the briquettes broke. Specifically, it was found that high density polyethylene resin powders having a green breaking strength of about 500 pounds or higher form better in the present process than resin powders which have a breaking strength of less than 500 pounds. Again, however, this does not mean that resin powders, of either high density polyethylene or other polymers, that fall below 500 pounds briquette breaking strength are unsatisfactory for use in the present process since other physical characteristics, such as the effect of sintering time and temperature on the polymers, may provide improved forming results. Generally forming is improved by sintering until a high degree of compaction is achieved.

A significant advantage of the powder process of this invention is the ability to control orientation in the finished part. For instance, high density polyethylene tubs have been made which show tensile strength improvement of up to four times over the tensile strength of unoriented high density polyethylene samples. The practical advantages of oriented containers would mean that thinner section parts can be made by taking advantage of concomitant higher strength, or a low cost polymer can be substituted for applications which now require the strength of higher cost engineering plastics.

Orientation can generally be controlled in the present invention by controlling when fusion occurs. If fusion occurs early in the forging cycle the polymer is extended and worked thereby increasing orientation. That is, if a smaller diameter briquette is used and is sintered properly, more orientation is usually obtained. Conversely, if larger diameter briquettes are used and sintered properly the resulting article can be made in such a way that it has a very low or no orientation. Such essentially stress-free (little orientation) parts have improved dimensional stability at high temperatures. For example, high density polyethylene and high density polyethylene foam containers have been made which did not noticeably distort when heated to 250° F. for ten minutes.

The versatility of the present process is typified by the various following specific examples thereof formed according to this invention and end products shown via cross sections of FIGS. 2 through 5 taken from the side wall of a container 22 which is formed at Step E of the process. The conditions employed with each Example is shown in Table I and the properties of the resulting container, to the extent measured being shown in Table II.

EXAMPLE I

A container formed according to the present invention using a high density polyethylene powder having a specific gravity of 0.96, a bulk density of 14 lb./ft.$^3$, a melt index of 0.3 and an average particle size of 26 microns.

EXAMPLE II

A container formed from the high density polyethylene in Example I which is highly oriented.

EXAMPLE III

A container formed from the high density polyethylene described in Example I which is essentially stress-free (little, if any, orientation).

EXAMPLE IV

A foam container formed from a blend (mixture) of the high density polyethylene described in Example I and 0.5% by weight Celogen O T (p,p'-oxybisbenzene sulfonyl hydrazide) and 3.5% by weight sodium bicarbonate powder as blowing agents.

EXAMPLE V

A foam container formed from the blend described in Example IV and 0.1% by weight titanium dioxide powder as a pigment.

EXAMPLE VI

A barrier container formed from a blend of 86% by volume of the high density polyethylene described in Example I and 14% by volume saran. The saran was a slurry polymerized 92 mole percent vinylidene chloride-8 mole percent methyl acrylate copolymer having an average particle size of 14 microns.

EXAMPLE VII

A barrier container formed from a blend of 40% by volume of the high density polyethylene described in Example I and 60% by volume saran as described in Example VI.

EXAMPLE VIII

A barrier multilayer container wherein the surface layers were formed of the blend described in Example VI and an inner layer of the same saran used in the blend of Example VI.

EXAMPLE IX

A barrier, rigid multilayer container wherein the surface layers were formed of the blend described in Example VI and the inner layer of the foamable blend described in Example IV.

EXAMPLE X

A container formed of acrylonitrile butadiene styrene terpolymer available as Blendex 311 from Marbon Chemical Company. This powdered resin has a specific gravity of 0.98, a bulk density of 17 lb/ft$^3$ and an average particle size of less than 40 mesh.

EXAMPLE XI

A container formed of an 86% by weight vinyl chloride, 14% by weight vinyl acetate copolymer available as Airco 121 from Airco Chemicals and Plastics Company having a specific gravity of 1.35, a bulk density of approximately 40 lb/ft$^3$ and a particle size small enough to completely pass through a 40 mesh screen.

EXAMPLE XII

A container formed from the HDPE powder described in Example I which had previously been put into a solution using heated xylene as a solvent and then allowed to recrystallize by slow cooling.

EXAMPLE XIII

A container formed from the HDPE powder described in Example I which had been solution polymerized and precipitated from the solution.

EXAMPLE XIV

A barrier container formed from a blend of 86% by volume of the HDPE described in Example XII and 14% by volume saran, the saran copolymer having 92% by weight vinylidene chloride therein.

EXAMPLE XV

A barrier multilayer container wherein the surface layers were formed of the HDPE described in Example XII and the inner layer of the saran described in Example XIV.

EXAMPLE XVI

A container formed of acrylonitrile butadiene styrene terpolymer available as Blendex 561 from Marbon Chemical Company.

EXAMPLE XVII

A foam, multilayer container wherein the surface layers were formed of the HDPE described in Example I and the inner layer of the same blend described in Example IV.

TABLE I

| | COMPACTION | | | SINTERING | | FORGING (Platen lubricated with Potassium oleate grease) | | | THERMOFORMING | | |
|---|---|---|---|---|---|---|---|---|---|---|---|
| Example | Amt. Gms. | Briq. Dia. (In.) | Press. (psi.) | Pre-heat Temp. °F. | Pre-heat Time Min. | Disc Dia. (In.) | Platen Temp. °F. | Dwell (Sec.) | Max. Force Lbs. | tub Size (In.) | Press (psi.) | Vac. In. of Hg. |
| I | 11 | 2 | 89,000 | (a) | 4 | 5.25 | 300 | 2.0 | 100,000 | 5.25"D × 1.5" deep | 60 | 25 |
| II | 13 | 1½ | 5,600 | 275 | 120 | 5.25 | 290 | 1.0 | — | 5.25"D | | |

TABLE I-continued

| | COMPACTION | | | SINTERING | | FORGING (Platen lubricated with Potassium oleate grease) | | | | THERMOFORMING | | |
|---|---|---|---|---|---|---|---|---|---|---|---|---|
| Example | Amt. Gms. | Briq. Dia. (In.) | Press. (psi.) | Pre-heat Temp. °F. | Pre-heat Time Min. | Disc Dia. (In.) | Platen Temp. °F. | Dwell (Sec.) | Max. Force Lbs. | tub Size (In.) | Press (psi.) | Vac. In. of Hg. |
| III | 13 | 3 | 22,000 | 290 | 30 | 5.25 | 290 | 1.0 | — | 5.25"D × 1.5" deep | 40 | 25 |
| IV | 9 | 3 | 7,000 | 290 | 8 | 5.25 | 290 | 1.0 | 95,000 | 5.25"D × 1.5" deep | 40 | 25 |
| V | 5 | 2.5 | 40,000 | 292 | 5 | 4.25 | 305 | 1.0 | 155,000 | 4.25"D × 1.5" deep | 15 | 25 |
| VI | ~9 | 1.5 | 5,600 | 290 | 7 | 5.25 | 300 | 2.0 | 95,000 | 5.25"D × 1.5" deep | 15 | 25 |
| VII | ~9 | 1.5 | 5,600 | 290 | 7 | 5.25 | 300 | 2.0 | | 5.25"D × 1.5" deep | 60 | 25 |
| VIII | skin layers 2 gms. inner layer 7 gms. | 1.5 | 5,600 | 290 | 15 | 5.25 | 290 | 1.0 | | 5.25"D × 1.5" deep | 60 | 25 |
| IX | skin layers 2 inner layer 7 | 2 | 86,000 | 290 | 7 | 5.25 | 300 | 2.0 | 110,000 | 5.25"D × 1.5" deep | 20 | 25 |
| X | ~10 | 2 | 86,000 | 290 | 7 | 5.25 | 300 | 2.0 | 100,000 | 5.25"D × 1.5" deep | 30 | 25 |
| XI | ~17 | 2 | 86,000 | 290 | 7 | 5.25 | 300 | 2.0 | 125,000 | 5.25"D × 1.5" deep | 60 | 25 |
| XII | 7.5 | 2 | 64,000 | (b) | 3.0 | 4 | 290 | 0.5 | 80,000 | 4" Dia. ×2.0" deep | 60 | 25 |
| XIII | 7.5 | 2 | 64,000 | (b) | 3.0 | 4 | 290 | 0.5 | 80,000 | 4" Dia. ×2.0" deep | 80 | 18 |
| XIV | 7.5 | 1.5 | 112,000 | (c) | 8 | 4 | 290 | 1 | 80,000 | 4"Dia. × 2.0" deep | 80 | 18 |
| XV | skin layers 2 inner layer 3 | 1.5 | 112,000 | (c) | 8 | 4 | 290 | 1 | 80,000 | 4" Dia. × 2.0" deep | 80 | 18 |
| XVI | 7.5 | 2 | 64,000 | (d) | 5 | 4 | 290 | 1 | 80,000 | 4" Dia. × 2.0" deep | 80 | 18 |
| XVII | skin layers 2 inner layer 3 | 1.5 | 112,000 | (c) | 10 | 4 | 290 | 1 | 80,000 | 4" Dia. × 2.0" deep | 80 | 18 |

(a) Heated by radiant heaters - Both top and bottom heaters were 2½ inches from the briquette and the surface temperature of the heaters was 530° F. The heaters were pulling 7.6 amps. of current.
(b) Heated by infra red heaters described in subscript (a) with amperage set at 7.
(c) Heated by infra red heaters described in subscript (a) with amperage set at 5.5.
(d) Heated by infra red heaters described in subscript (a) with amperage set at 6.5.

TABLE II

PROPERTIES OF CONTAINERS

| Example | Ave.(c) T.S. at Yield (psi) | Ave. T.S. at Rupture (psi) | Ave. Elong. % | Ave. $O_2$ permeation(d) cc-mil/100 in²/ atm/day | Density lb/ft³ | Heat Stability Comment |
|---|---|---|---|---|---|---|
| I | — | — | — | — | — | |
| II | 3380 | 8710 | 86 | — | 58.6 | Distorts when heated for 10 min. at 250° F. |
| III | 1960 | 2540 | 507 | 206 | 57.3 | Does not distort when heated for 10 min. at 250° F. |
| IV | 1260 | 2300 | 12 | — | 38 | Does not distort when heated for 10 min. at 250° F. |
| V | — | — | — | — | 30 | |

TABLE II-continued

| | PROPERTIES OF CONTAINERS | | | | | |
|---|---|---|---|---|---|---|
| Example | Ave.[c] T.S. at Yield (psi) | Ave. T.S. at Rupture (psi) | Ave. Elong. % | Ave. $O_2$ permeation[d] cc-mil/100 in$^2$/ atm/day | Density lb/ft$^3$ | Heat Stability Comment |
| VI | 2570 | 3790 | 12 | 3.7 | — | |
| VII | 3410 | 4250 | 22 | 0.12 | — | |
| VIII | 3680 | 5050 | 20 | <.06[a] | — | |
| IX | — | — | — | 3.0[b] | — | |
| X–XVII | — | — | — | — | | |

[a] Based on the thickness of the inner saran layer only.
[b] Based on the calculated thickness of the HDPE-saran blend layer only.
[c] Tensile strength measured by ASTM test method D1703-66.
[d] Oxygen permeation measured by the Dow Mass Spectrometer Gas Transmission Rate Apparatus.

Referring more specifically to FIGS. 2–5, section 24 of FIG. 2 represents a solid polymer such as the high density polyethylene container of Example I. The properties of this container can be varied, so far as orientation or heat distortion temperature properties are concerned, as described earlier herein. These particular features of this Example were not measured.

Section 26 shown in FIG. 3 is an all-foam container such as that of Example IV which has high insulation properties. The process of the present invention can be employed to produce rigid foam articles such as wide mouthed foamed containers like cups, trays, tubs, disposable dinnerware, delicatessen packages or the like. These parts have a dense surface which seals the inner porous structure and they can be made in such a way that they have a high practical heat distortion temperature. The process can be carried out on the same relatively inexpensive, high speed machinery used for Example I. The only modification from the process as previously described is that a dry blended mixture of a thermoplastic powder and a chemical blowing agent is used instead of the powder resin alone. The blowing agent must be selected so as to be activated at the right temperature, in the forging step. When the forging press opens, it allows the preform to foam. The preform can then be thermoformed into containers as previously described.

Section 28 is a container formed from a dry admix or blend of different resins. The blend is formed into the initial briquette, then forged and formed into final shape. There are an infinite number of blend combinations possible with this technique including resin polymers, pigments, flame retardants, metals, glasses, ceramics and other inorganics, solid lubricants, reinforcing fibers such as glass fibers or platelets, magnetic particles, or particles with other desirable electrical or thermal properties, high cost and low cost powders, or high strength with low strength powders to permit designing a part with desired properties. The section 28 shown in FIG. 4 can be like Examples VI, that is, a base resin (matrix) of high density polyethylene 30 including particles 32 of saran disbursed in the polyethylene matrix, and which are sheared into platelets or elongated particles during the forging step so that gases and the like which permeate through the section 28 have to follow a tortuous path, as indicated by the arrow, around the saran particles 32. A container made from a blend of polyethylene and 14% by volume of saran powder, had an oxygen permeation rate of 3.7 cc-mil/100 in$^2$/atm/day. This compares with a value of 200 cc-mil/100 in$^2$/atm/day for the high density polyethylene by itself.

Other base resin (matrix) powders, such as polystyrene, and other barrier resin powders, such as acrylonitrile homopolymers or copolymers, may be disbursed therein to obtain a container or other article having excellent barrier properties to gases and/or moisture vapor, as described above, wherein the barrier resin is formed into platelets or elongated particles in a matrix of the body supporting base resin during the forging step. By forming containers out of physical mixtures or blends of high density polyethylene and saran as above described, for example, articles have thus been produced wherein the saran acts as the continuous material with the result that excellent oxygen or other gas barrier and moisture vapor permeability are both achieved within the container. The high density polyethylene adds to the rigidity of the container and also acts as a less expensive filler to reduce the cost of an article against what it would have cost, if it were made only out of saran. Of course, other fillers might also be employed. The present process permits satisfactory thermoforming of a container the resin of which (in this case saran) in other processes would experience significant heat degradation.

Section 34 includes skin layers 36 and a core layer 38 which is illustrated by Examples VIII and IX. Here the skins 36 can be comprised of tough, less expensive materials and the core 38 can comprise expanded (foam) materials or barrier materials to compliment, from either barrier or insulation standpoints, the toughness of the skins. The multilayers can be formed at stage B by alternatively charging and compressing each layer in the mold 14, which are to form the various layers of the multilayered structure 34. The multilayered containers formed from the present process permits an economical container having excellent barrier and/or insulation characteristics due to the core layer. Also, eliminated is the problem of having a multilayered structure which is formed from laminates or coextruded sheet in that the sheet scrap from which such thermoformed containers are stamped is essentially lost because its diverse characteristics make it unsuitable for a regrind. The scrap-free process of the present invention avoids such losses.

The process of this invention, as disclosed in FIG. 1 hereof, was also practiced using ultra high molecular weight polyethylene (UHMWPE) powders to successfully form containers. 1½" and 2½" diameter briquettes were formed from an Allied Chemical UHMWPE powder identified as "A-C ® Polyolefin 1225", having a molecular weight of about 2.8 million, and from an experimental UHMWPE powder of The Dow Chemical Company having a molecular weight of about 4 million. The Allied powder, however, was blended with 25 weight percent of a Dow Chemical B3000 Saran resin powder (−140 mesh fraction of saran).

The as-received powder was weighed into 7.5 gram samples and briquetted on a press at 30,000 psi. Briquettes were heated in an infrared oven at 5.5 amps for 7½ to 15 minutes, or in a convection oven at 275° F. for 10 minutes. Forging platen temperature was 300° F. and forming plug temperature was 265° F. A lubricant containing 5% silicone was applied to the platens.

The response of the UHMWPE powder to briquetting, sintering, and forge-forming conditions was not noticeably different from that of conventional high density polyethylene powder. However, tubs were not successfully made from 1½ inch diameter briquettes. The high recovery forces resulted in the preform pulling free of the lip ring either after the forging step or in forming. It is believed that a lip ring design is feasible which would eliminate this problem. Satisfactory tubs were made from 2½ inch diameter briquettes, and tensile properties of tubs and preforms are given in Table III. Of significance is the almost 200% increase in tub strength compared to a compression molding. Typical tub-bottom strength of high density polyethylene tubs is about 10,000 psi compared to 15,000 psi for UHMWPE tubs. Of the two saran-containing tubs tested for permeability, one was a leaker and the other gave a value comparable to a tub from high density polyethylene-saran powder of the same extension ratio. The UHMWPE powder and saran powder are compatible and successfully produce a satisfactory tub. The response of the Dow UHMWPE powder was the same as that of the Allied powder except for the presence of an occasional blotch on the tub due to gels or some other inclusion.

It is clear from the above example that the process of this invention is capable of producing a thin section part (0.013") from a relatively intractable polymer under nonmelt conditions and that tensile strength of such a part may be increased close to 200% over that of a compression molding.

TABLE III

| TENSILE PROPERTIES OF UHMW POLYETHYLENE* | | |
|---|---|---|
| | ULTIMATE TENSILE STRENGTH, PSI | ULTIMATE PERCENT ELONGATION |
| Disc forged from 1½ inch dia. briquetta | 10,000 | 50 |
| Disc forged from 2½ inch dia. briquette | 7,000 | 129 |
| Compression molding (from Allied data) | 5,600 | 400 |
| **Tub - bottom | 15,000 | 89 |
| Tub wall Radial direction | 14,000 | 57 |
| Tub wall Circum. direction | 11,600 | 104 |

*Allied Chemical Co., AC 1225
** Tubs were made from 2½ inch diameter briquettes.

While certain representative embodiments and details have been shown for the purpose of illustrating the invention, it will be apparent to those skilled in the art that various changes and modifications can be made therein without departing from the spirit and scope of the invention. For example, the briquettes can be distortion printed or inked if printing is desirable on the final article. Also, it is to be understood that sintered briquettes include within their scope, resin powders which have an alpha transition temperature at or below ambient room temperature such that no actual addition of heat is necessary to forge the same after the resin particles are compacted into the briquette, or resin powders which have been raised to or above their alpha transition temperature either prior to and/or during compression of the same into briquettes, so that heating subsequent to compaction of the resin particles into the briquette is unnecessary. Thermoset resins such as a powdered epoxy may possibly be used in certain variations of the process. Other articles than containers might be formed by the process of this invention, such as gears, bushings, housings, bearings, multilayered automatic fan blades which change pitch as a function of temperature rather than engine speeds, and the like.

What is claimed is:

1. A process for forming a foam thermoplastic article having dense surfaces and a porous less dense inner structure comprising the steps of:
    (a) dry blending a mixture of a thermoplastic powder and a chemical blowing agent in sufficient quantity to make said article;
    (b) compressing said blend into a briquette having green strength;
    (c) heating said briquette to a temperature in the range from about the alpha transition temperature to less than the melt forming temperature of said powder and the activation temperature of said blowing agent;
    (d) maintaining said temperature for a period sufficient to soften and sinter said briquette; and
    (e) forging said briquette within said temperature range with sufficient heat to activate said blowing agent, and with substantial plug flow deformation to obtain substantial fusion of the powder forming said article while providing said dense surfaces.

2. The process of claim 1 wherein the blowing agent is selected so as to be activated at a temperature greater than that experienced in steps (c) and (d).

3. The process of claim 1 wherein the blowing agent is selected so as to be activated at a temperature less than melt forming temperature of said powder.

4. The process of claim 3 wherein the blowing agent is selected so as to be activated at about the forging temperature necessary to obtain substantial fusion of said powder as set forth in step (e).

* * * * *